Dec. 1, 1964         A. F. KENDLE         3,159,367
SUPPORT BRACKET FOR COLLAPSIBLE TUBES
Filed May 9, 1962

Andrew F. Kendle
INVENTOR.

BY R. T. Sperry
ATTORNEY

United States Patent Office 3,159,367
Patented Dec. 1, 1964

3,159,367
SUPPORT BRACKET FOR COLLAPSIBLE TUBES
Andrew F. Kendle, 1707 N. Alexander Road, Tampa, Fla.
Filed May 9, 1962, Ser. No. 193,393
1 Claim. (Cl. 248—108)

This invention relates to tube holders and is particularly concerned with means for releaseably retaining collapsible tubes and like objects in a convenient vertical position, wherein such means may readily receive and retain an object of this type, while permitting release thereof under manual force when the object is to be used.

While the basic inventive concept herein set forth, may be readily applicable to a retention of a wide variety of objects, its present preferred use as herein set forth is in connection with the holding of collapsible tubes such as those used for shaving cream, tooth paste, cosmetics and the like. The primary object of the invention is to provide a simple, convenient and inexpensive device for retaining objects in a vertical position, parallel to a wall upon which the device is supported. A further object of the invention is to provide a tube holder of the character set forth in which a tube may be readily inserted and withdrawn and one which requires no mechanical manipulation of the holder for the insertion or withdrawal of a tube. It is also an object of the invention to provide a holder for tubes which may accommodate the tube and retain the same, regardless of the size, shape or partial previous discharge of material from the tube. Numerous other objects, features and advantages of the present invention will be apparent from a consideration of the accompanying drawings, in which—

Figure 1:
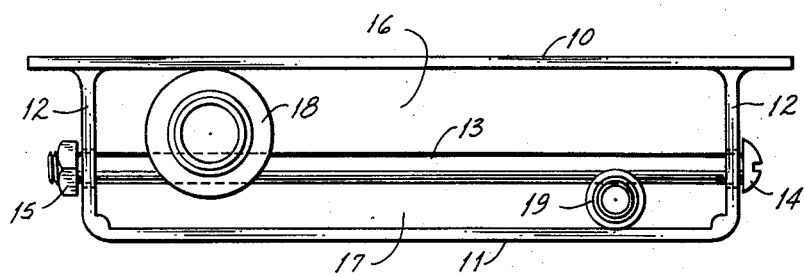
FIGS. 1 is a top plane view of one embodiment of the present invention.
Figure 2:
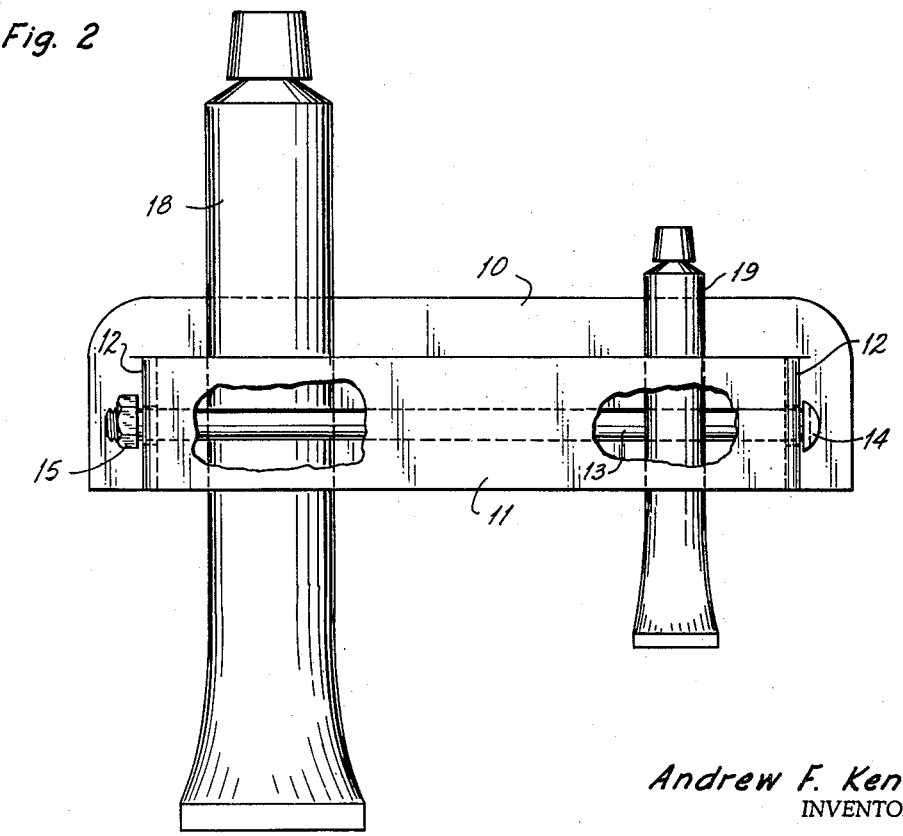
FIG. 2 is a side elevation, partly broken away, of that form of the invention shown in FIGURE 1.

In general terms, the invention may be defined as comprising a bracket to be secured to a vertical wall, and defining an elongate central opening divided by a rod to define a wide and a narrow tube receiving passageway. In the drawings the bracket is disclosed as including an elongate generally rectangular backing plate 10 formed with an elongate generally U-shaped conforming front plate 11, the end legs 12 of which are formed integral with or are attached to the backing plate 10. Between the front plate 11 and the back plate 10 there is provided an intermediate bar 13. The bar 13 is here shown as formed by a bolt with a head 14 at one end adjacent the outer face of one of the legs 12 and with a nut 15 at the opposite end adjacent the outer face of the opposite other leg 12. In this form of the invention it is preferred that the apertures of the legs which receive the bar 13 are of slightly greater diameter than the bar, so as to permit free rotation of the bar as a tube in inserted between the bar and either the backing plate 10 or the front plate 11. In connection therewith it will be understood that the nut 15 is but loosely threaded on the bolt so that the bolt will not be frictionally engaged by the legs 12 precluding free rotation thereof.

As indicated in FIGURE 1 of the drawings, the bar 13 is located in a further spaced relation from the backing plate 10 than from the front plate 11, thus to define a relatively wide longitudinal space 16 between the bar 13 and the backing plate 10 and a relatively narrow longitudinal space 17 between the bar and the front plate 11. Thus, as seen in the drawings a relatively large tube 18 may be received in the space 16 and retained by the bar, while a smaller tube 19 may be similarly retained in the space 17. It will be understood that the width of the spaces 16 and 17 are somewhat slightly less than the normal diameter of the tubes 18 and 19 so that by a slight compression of the tubes it will permit their insertion in the spaces while the tubes are new and in fully filled condition. Since the upper circular end of such tubes adjacent the caps are usually of more rigid formation than the side walls of the tubes, downward movement of the tubes through the spaces 16 or 17 is precluded, even though the tubes become almost fully emptied.

While the invention is not concerned with the materials from which the holder may be formed, it will be noted that the structure of the body bracket is readily adapted to simple and economic manufacture from plastic materials, or it may be formed from wood, ceramics or metals. Similarily, the rod 13 may be of plastic in which case it could be welded to the legs. A threaded metal bolt, as here shown, may however be preferable. The invention further contemplates that the front plate 11 may be formed by a similar rod.

From the foregoing it will be seen that the present invention presents a novel, simple and improved tube holder which may be economically manufactured and which provides means for retaining a tube in vertical convenient location and in which a tube may be inserted or withdrawn without mechanical manipulation of the device. It will, of course, be understood that in the practice of the invention, numerous changes, modifications and the full use of equivalents may be resorted to without departure from the spirit or scope of the invention, as outlined in the appended claim.

What I claim is:

A collapsible tube holder including a vertical back plate adapted to be secured to a wall, vertical side legs disposed in parallel spaced planes adjacent the ends of said back plate and extending outwardly therefrom, a vertical front plate secured between the outer ends of said side legs spaced from and parallel to said back plate, and an intermediate member between said back plate and said front plate, longitudinally dividing the space therebetween into longitudinal spaces of different width, said intermediate member being a bolt rotatably mounted between said side legs.

References Cited by the Examiner
UNITED STATES PATENTS

| | | | |
|---|---|---|---|
| 1,666,063 | 4/28 | Aubrey | 211—16 |
| 2,248,916 | 7/41 | Opper | 211—60 |

FRANK L. ABBOTT, *Primary Examiner.*

CLAUDE A. LE ROY, *Examiner.*